United States Patent
Kashyap

(10) Patent No.: US 7,382,721 B2
(45) Date of Patent: Jun. 3, 2008

(54) NODAL COMPUTER NETWORK

(75) Inventor: Asheesh Kashyap, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 786 days.

(21) Appl. No.: 10/832,874

(22) Filed: Apr. 27, 2004

(65) Prior Publication Data

US 2005/0238030 A1   Oct. 27, 2005

(51) Int. Cl.
*H04J 1/16* (2006.01)
*H04J 3/24* (2006.01)
*H04L 12/28* (2006.01)
*H04L 12/66* (2006.01)
*H04L 12/56* (2006.01)

(52) U.S. Cl. ............ 370/217; 370/235; 370/248; 370/254; 370/356; 370/400; 370/473; 370/474; 709/223

(58) Field of Classification Search ............ None
See application file for complete search history.

(56) References Cited

U.S. PATENT DOCUMENTS

| | | | |
|---|---|---|---|
| 5,130,982 A * | 7/1992 | Ash et al. ............... 370/352 |
| 5,170,482 A | 12/1992 | Shu et al. | |
| 5,642,524 A | 6/1997 | Keeling | |
| 5,669,008 A | 9/1997 | Galles et al. | |
| 5,701,416 A | 12/1997 | Thorson et al. | |
| 5,729,756 A | 3/1998 | Hayashi | |
| 6,101,181 A | 8/2000 | Passint et al. | |
| 6,215,771 B1 * | 4/2001 | Turner et al. ............... 370/235 |
| 6,230,252 B1 | 5/2001 | Passint et al. | |
| 6,470,029 B1 * | 10/2002 | Shimizu ............... 370/468 |
| 6,584,500 B1 * | 6/2003 | Arkko ............... 709/223 |
| 6,816,585 B1 * | 11/2004 | Blatt et al. ............ 379/221.03 |
| 7,095,712 B2 * | 8/2006 | Kinoshita et al. ............ 370/217 |
| 7,209,975 B1 * | 4/2007 | Zang et al. ............... 709/238 |
| 2004/0042493 A1 | 3/2004 | Emmot | |

* cited by examiner

*Primary Examiner*—Melanie Jagannathan

(57) ABSTRACT

A nodal computer network comprises a plurality of nodes grouped into different classes. The classes include at least a first class of fully interconnected nodes and a second class of fully interconnected nodes, and the first class includes a source node having an information packet to be communicated to a destination node. The source node is configured to divide the information packet into segments and to disperse the segments among the nodes of the first class. The nodes of the first class are configured to transmit each of said segments directly to the nodes of said second class, wherein the first class is not fully interconnected with the second class.

15 Claims, 9 Drawing Sheets

NODAL COMPUTER NETWORK

RELATED ART

Multiprocessor computer systems often comprise a number of processing-element nodes connected together by a nodal network. Each such processing-element node typically includes at least one processing element and memory. The nodal network transmits packets of information or messages between processing-element nodes.

Multiprocessor computer systems having up to hundreds or thousands of processing-element nodes are typically referred to as massively parallel processing (MPP) systems. In a typical MPP system, the processing elements may be configured so that each processing element can directly address all memory, including the memory of another (remote) node, without involving the processing element at the remote node. Instead of treating processing element-to-remote memory communications as an I/O operation, reads or writes to another node's memory are often accomplished in the same manner as reads or writes to the local memory. In such MPP systems, the infrastructure that supports communications among the various processing-element nodes greatly affects the performance of the MPP system because of the level of communications required among processing elements.

Several different topologies have been proposed to interconnect the various nodes in such MPP systems, such as rings, stars, meshes, hypercubes, and torus topologies. Regardless of the topology chosen, design goals generally include a high communication bandwidth (i.e., large amount of content exchanged between nodes), a low inter-node distance, a low cost, a high network bisection bandwidth and a high degree of fault tolerance. It is also desirable for the chosen topology to be highly scalable so that new nodes can be easily added as necessary or desired. Although many current topologies have achieved fairly good results in satisfying at least some of the foregoing goals, improved topologies that provide even better results are generally desirable.

SUMMARY OF THE DISCLOSURE

Generally, embodiments of the present disclosure pertain to nodal computer networks and methods for communicating within nodal computer networks.

A nodal computer network in accordance with one exemplary embodiment of the present disclosure comprises a plurality of nodes grouped into different classes. The classes include at least a first class of fully interconnected nodes and a second class of fully interconnected nodes, and the first class includes a source node having an information packet to be communicated to a destination node. The source node is configured to divide the information packet into segments and to disperse the segments among the nodes of the first class. The nodes of the first class are configured to transmit each of said segments directly to the nodes of said second class, wherein the first class is not fully interconnected with the second class.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

Embodiments of the present disclosure generally pertain to nodal computer networks and methods for communicating information in nodal computer networks.

Figure 1:
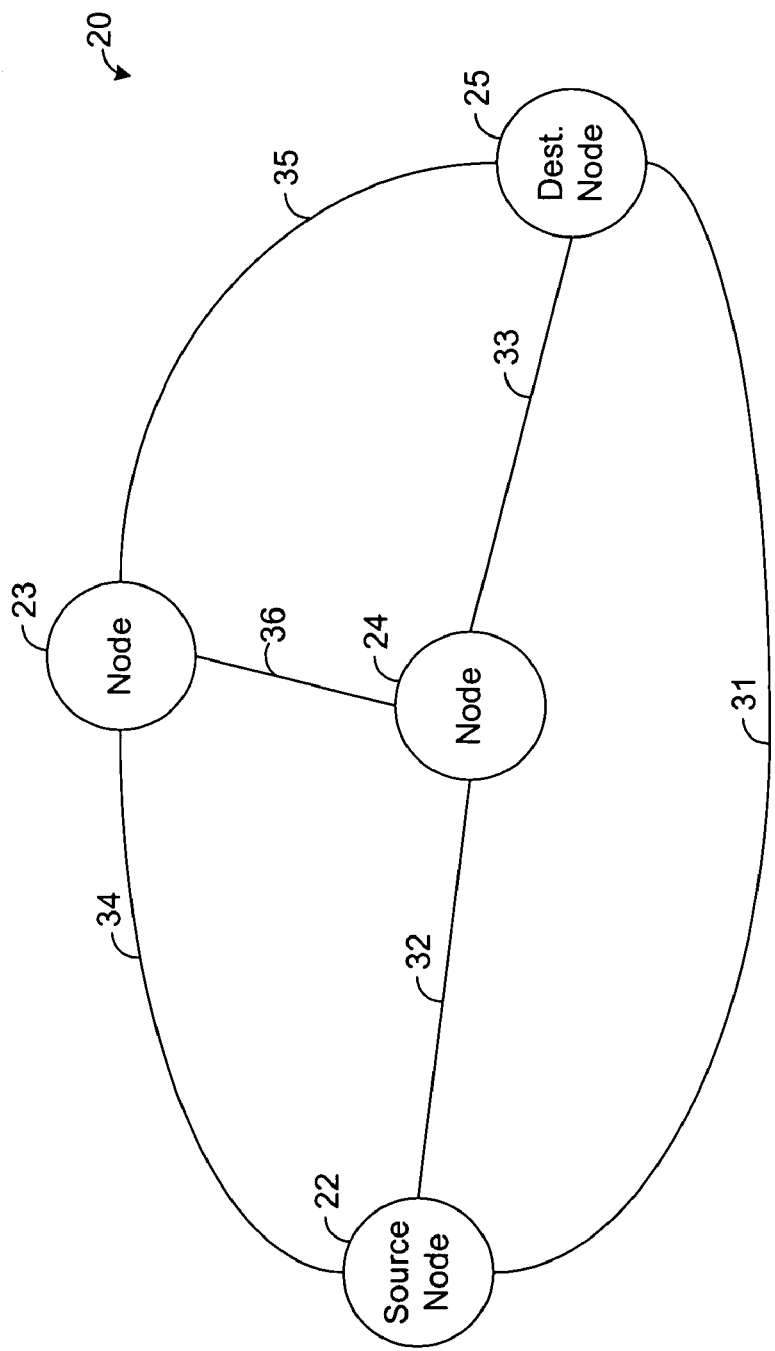
FIG. 1 is a block diagram illustrating an exemplary nodal computer network.

An exemplary nodal computer network is depicted by FIG. 1. The nodal computer network 20 of FIG. 1 comprises various network nodes 22-25 that may be used to communicate information packets through the network 20. The term "packet," as used herein, is not intended to connote any definitive structure, format, or protocol, but merely is an identifiable quantity of data or information to be communicated from one node, referred to as a "source node," to another node, referred to as a "destination node."

As shown by FIG. 1, the nodes 22-25 are interconnected according to a desired topology thereby forming channels 31-36 between the nodes 22-25. A "channel" refers to any communication connection or link that may be used to communicate from one node to another. Further, a "path" refers to a set of channels and nodes that are used to communicate information from a source node to a destination node. For example, the exemplary network 20 shown by FIG. 1 provides at least three independent paths that may be used to communicate data from the source node 22 to the destination node 25. Specifically, channel 31 provides one such path. In addition, node 24 and channels 32 and 33 provide another path. In this regard, source node 22 may transmit information over channel 32 to node 24, which may then route the information to destination node 25 via channel 33. Similarly, node 23 and channels 34 and 35 provide yet another path between source node 22 and destination node 25.

To communicate an information packet from the source node 22 of FIG. 1 to the destination node 24, the source node 22 preferably divides the packet into multiple segments and then communicates each segment over a different path to the destination node 25. For example, in the exemplary network 20 depicted by FIG. 1, the source node 22 may divide an information packet into three segments and communicate a respective one of the segments over each of the channels 31, 32, and 34 such that each packet arrives at the destination node 25 via a different one of the three independent paths described above. The destination node 25, after receiving the communicated segments, reassembles the segments to recover the original information packet previously divided by the source node 22.

Figure 2:
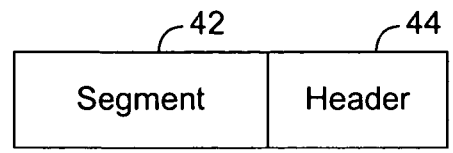
FIG. 2 is a block diagram illustrating an exemplary segment and header that may be communicated by a nodal computer network.

For each transmitted segment, the source node 22 attaches a header. For example, FIG. 2 depicts one of the aforementioned segments 42, which is attached to a header 44. The header 44 includes the address of the destination node 25. An intermediate node 23 or 24 (i.e., a node other than the source and destination node) receiving the segment 42 routes the segment 42, along with its header 44, from one channel to another based on the destination address in the header 44. For example, node 24 uses the destination address in the header 44 to route the segment 42, along with header 44, to channel 33 and ultimately to destination node 25.

The header 44 may include a sequence indicator indicative of the segment's 42 sequence within the packet divided by the source node 22. Using such an indicator for each segment received by the destination node 25, the destination node 25 places the segments in the proper order to recover the packet originally divided by the source node 22. Commonly-assigned U.S. patent application Ser. No. 10/231,606, entitled "System and Method for Communicating Information Among Components in a Nodal Computer Architecture," which is incorporated herein by reference, describes in further detail techniques that may be employed by the nodal computer network 20 of FIG. 1 to communicate segmented information packets.

Figure 3:
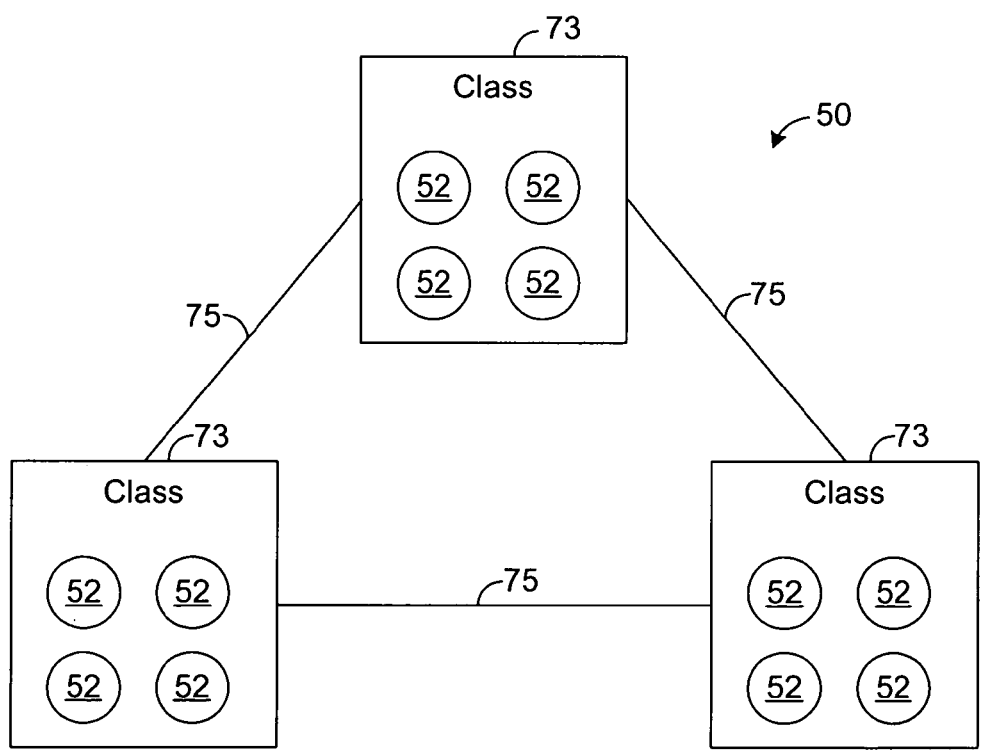
FIG. 3 is a block diagram illustrating a nodal computer network in accordance with an exemplary embodiment of the present disclosure.
Figure 4:
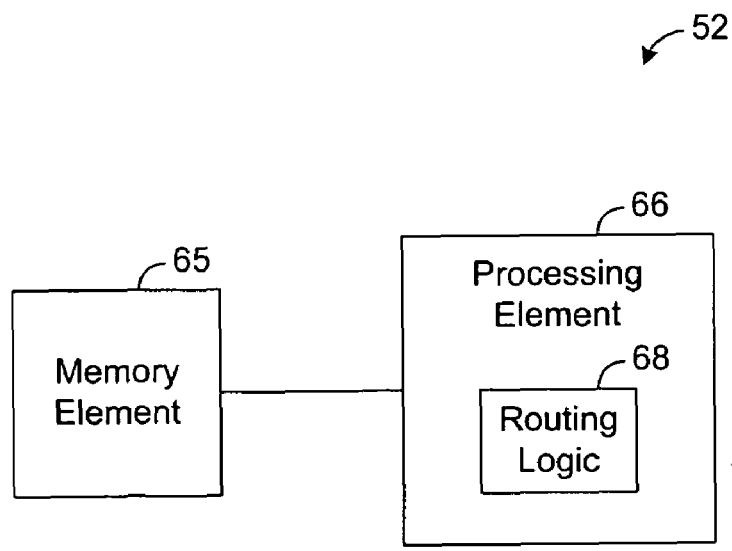
FIG. 4 is a block diagram illustrating an exemplary node of a nodal computer network, such as is depicted by FIG. 3.

FIG. 3 depicts another exemplary embodiment of a nodal computer network 50. As shown by FIG. 3, the network 50 comprises a plurality of nodes 52. FIG. 4 depicts a an exemplary embodiment for any one of the nodes 52 depicted in FIG. 3. The node 52 depicted by FIG. 4 comprises a memory element 65 for storing data and a processing element 66. The processing element 66 comprises at least one processor, such as a central processing unit (CPU) or a digital signal processor (DSP), for processing information, such as the data stored in memory element 65. During operation, the processing element 66 writes to and reads from the memory element 65 residing in the same node 52 and/or writes to and reads from memory elements 65 residing in other nodes 52. As shown by FIG. 4, the node 52 comprises routing logic 68, which may be implemented in hardware, software or a combination thereof. The routing logic 68 controls the routing of information between the different nodes 52 of the network 50 (FIG. 3).

As shown by FIG. 3, the nodes 52 of the network 50 are preferably grouped into different classes 73, and the classes 73 are interconnected via a plurality of channels 75. Each class 73 preferably comprises the same number of nodes 52. In the exemplary embodiment depicted by FIG. 3, each class 73 comprises four nodes 52, although other numbers of nodes 52 may be employed in each class 73 in other embodiments. Further, although the system 50 will be described hereafter as comprising the same number of nodes 52 in each class 73, it should be noted that it is possible for different classes 73 to comprise different numbers of nodes 52.

Figure 5:
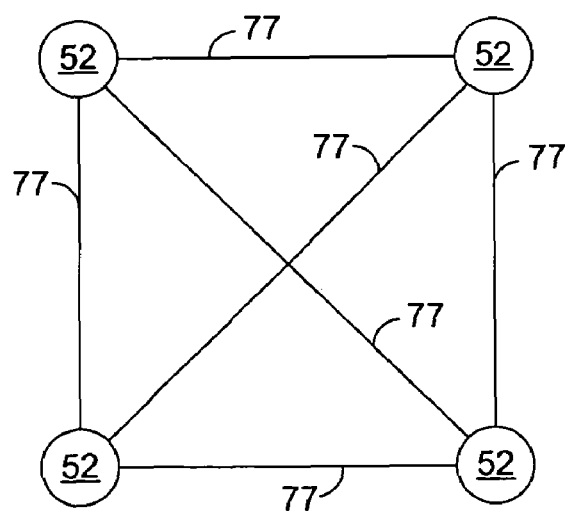
FIG. 5 is a block diagram illustrating an exemplary class of a nodal computer network, such as is depicted by FIG. 3.

As shown by FIG. 5, each node 52 of the same class 73 is directly coupled to each of the other nodes 52 of the same class 73 via a channel 77. Note that two nodes 52 are "directly" coupled to one another when a channel extends between the two nodes 52 without passing through another node 52 such that information may be passed between the two nodes 52 without being processed by a third node 52. Indeed, as shown by FIG. 5, the nodes 52 of the same class 73 are fully interconnected via channels 77 such that any one node 52 may directly communicate with any other node 52 of the same class 73.

Figure 6:
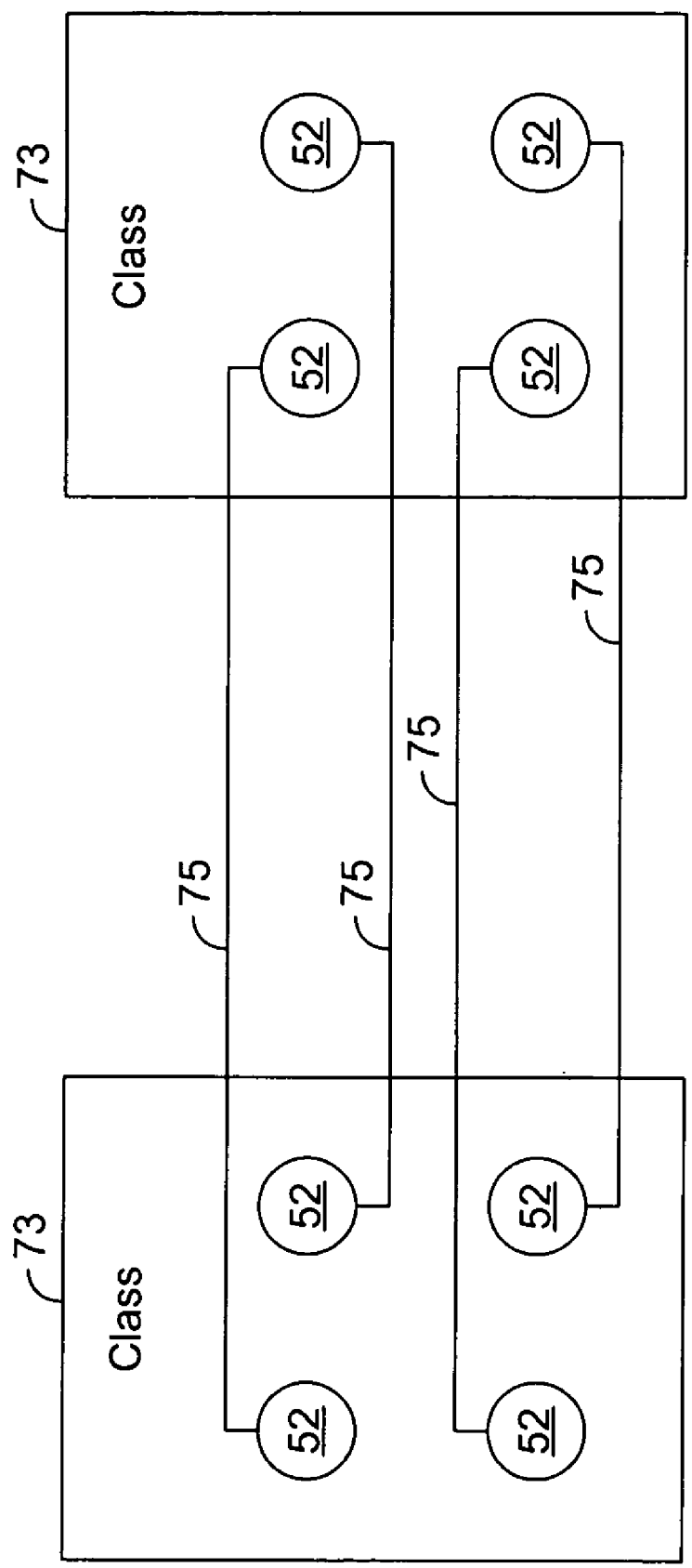
FIG. 6 is a block diagram illustrating an exemplary embodiment of two interconnected classes of a nodal computer network, such as is depicted by FIG. 3.

In a preferred embodiment, each node 52 of a class 73 is directly coupled to a respective node 52 of at least one of the other classes 73. For example, FIG. 6 depicts two classes 73 of the network 50 (FIG. 3). As shown by FIG. 6, each node 52 of one of the classes 73 is directly coupled to a respective node 52 of the other class 73 via a channel 75. To reduce the number of channels in the network 50 and, therefore, to lower the cost of the network 50, it is generally desirable for each node 52 of one class 73 to be coupled directly to only one node of another class 73, as shown by FIG. 6. However, it is possible for any of the nodes 52 to be coupled directly to multiple other nodes 52 of a single different class 73, if desired.

Figure 7:
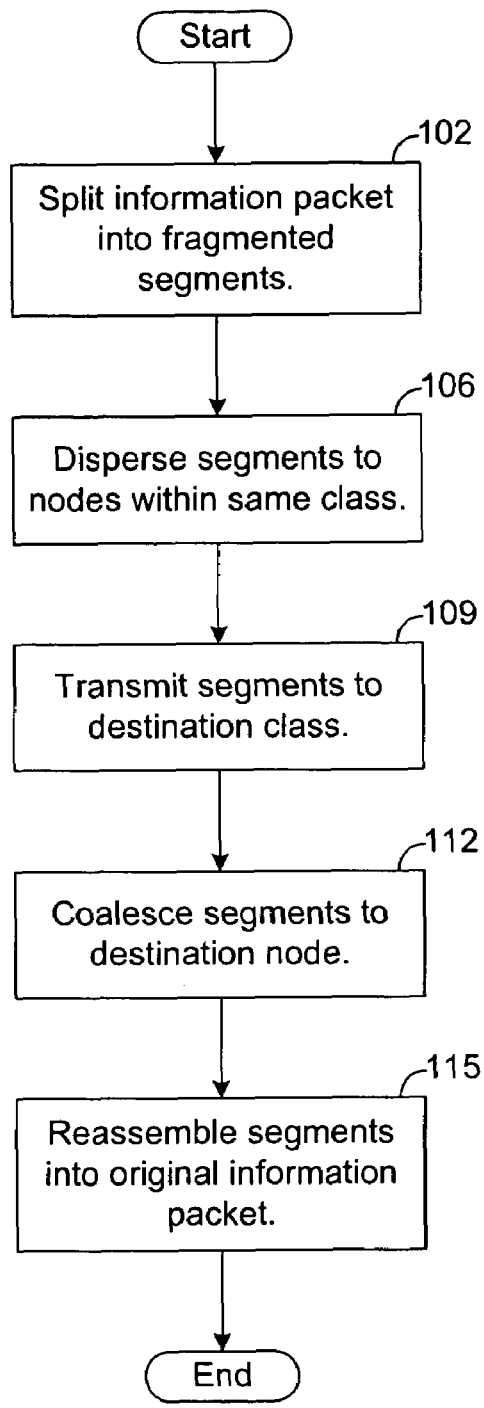
FIG. 7 is a flow chart illustrating an exemplary methodology for communicating an information packet between two classes of a nodal computer network, such as is depicted by FIG. 3.

When a node 52, referred to hereafter as "source node 52," of one class 73, referred to hereafter as "source class 73," is to transmit a packet of information to a node 52, referred to hereafter as "destination node 52," of another class 73, referred to hereafter as "destination class 73," the routing logic 68 (FIG. 4) of the source node 52 divides the packet into segments 42 (FIG. 2), as shown by block 102 of FIG. 7. In a preferred embodiment, the source node 52 splits the packet into a number of segments 42 (FIG. 2) equaling the number of nodes 52 in the source class 73. Thus, in the exemplary embodiment depicted by FIG. 3 where each class 73 has four nodes 52, the source node 52 splits the information packet into four segments 42 (FIG. 2). However, in other embodiments it is possible to split the packet into a number of segments that is either greater than or less than the number of nodes 52 in the source class 73.

Similar to the source node 22 of FIG. 1, the source node 52 in the present example attaches a header 44 to each segment 42. The header 44 comprises an address identifying the destination node 52 and, therefore, the destination class 73. The header 44 may also comprise a sequence indicator that may later be used by the destination node 52 to reassemble the segments 42 into the original information packet, similar to the manner in which the destination node 25 of FIG. 1 reassembles received segments 42.

After splitting the information packet into multiple segments 42, the source node 52 then disperses the segments 42 to the other nodes 52 of the source class 73, as shown by block 106 of FIG. 7. In the present example where there is the same number of segments 42 and nodes 52 in the source class 73, the routing logic 68 of the source node 52 transmits a different segment 42 to each of the other nodes 52 of the source class 73. For each segment 42, the source node 52 uses the channel 77 (FIG. 5) that directly couples the source node 52 and the other node 52 that is to receive the segment 42. Thus, after performing block 106, each of the nodes 52, including the source node 52, of the source class 73 has a different segment 42 of the original information packet.

The routing logic 68 of each node 52 of the source class 73 transmits its respective segment 42 to the destination class 73, as depicted by block 109 of FIG. 7. According to the network topology depicted by FIGS. 3-6, each node 52 of the source class 73 is directly coupled to one node 52 of the destination class 73 via a channel 75, and each node 52 of the source class 73 uses one of these channels 75 to directly transmit one of the segments 42 of the original information packet to a node 52 of the destination class 73. Thus, each of the nodes 52 of the destination class 73 receives a different one of the segments 42 of the original information packet.

As shown by block 112 of FIG. 7, the nodes 52 of the destination class 73, after receiving the segments 42 from the source class 73, coalesce the segments 42 to the destination node 52 that is within the destination class 73. In this regard, the routing logic 68 (FIG. 4) of each of the nodes 52 in the destination class 73 transmits its respective segment 42 to the destination node 52 via the channel 77 (FIG. 5) that directly couples the transmitting node 52 and the destination node 52. After receiving the coalesced segments 42, the routing logic 68 of the destination node 52 reassembles the segments 42 to recover the original information packet, shown by block 115 of FIG. 7.

By grouping nodes 52 into different classes 73 and using the methodology depicted by FIG. 7, an information packet can be efficiently communicated from any node 52 of any one class 73 of the network 50 to any node 52 of any other class 73. Further, network topologies of the present disclosure have many advantages over many conventional network topologies. For example, the network 50 described herein has a small network diameter relative to comparable networks known in the art. In this regard, the "length" of a path refers to the number channels traversed by a segment 42 that follows the path. In the example described above, each segment 42 (except the segment 42 transmitted from the source node 52 directly to a node 52 of the destination class 73 and the segment 42 received by the destination node 52 directly from the source class 73) traverses three channels (one channel within the source class 73, one channel between the source class 73 and the destination class 73, and one channel within the destination class 73). If each class 73 of the network 50 is connected to the source class 73 as described above, then the maximum path length for any packet communicated by a source node 52 to any node 52 external to the source class 73 is three.

In addition, the network 50 described herein is highly scalable. In this regard, additional classes 73 can be easily added to the network 50. Further, it is possible to add additional classes 73 and, therefore, additional nodes 52 without significantly reducing the bandwidth of the network 50. Indeed, if each newly added class 73 is connected to each of the other classes 73 of the network 50 as described herein and depicted by FIG. 6, then it is possible to add new classes 73 while the network bandwidth remains constant.

To reduce network diameter, each class 73 is preferably coupled directly to each of the other classes 73 such that an information packet may be transmitted directly from any one class 73 to any other class 73. However, if two classes 73 are not directly coupled to each other, then the segments 42 may be routed from the source class 73 to the destination class 73 via one or more intermediate classes 73 providing a path between the source class 73 and the destination class 73. In such an embodiment, block 109 of FIG. 7 is performed by continually transmitting the segments 42 from one class 73 to the next until the segments 42 arrive at the destination class 73. Once the segments 42 arrive at the destination class 73, block 112 may be performed and the methodology depicted by FIG. 7 may be completed as described herein.

By using the network topologies described above it is possible to achieve relatively good network performance at a relatively low cost. For example, assume that a network in accordance with embodiments of the present disclosure has n nodes grouped into various classes in which each class has the same number of nodes and the number of classes equals the number of nodes in each class. Further, assume that the nodes in each class are fully interconnected (i.e., each node is directly coupled to each of the other nodes in the same class) and that each node is directly coupled to only one node in each of the other classes. It has been shown that such a network, referred to hereafter as the "grouped network," can cost less than a fully interconnected network (i.e., a network in which each node is directly coupled to all of the other nodes in the network) having the same latency and number of nodes by approximately a factor of n. The rate provided by the fully interconnected network, however, is generally greater than the rate of the grouped network by approximately a factor of n. In addition, it has also been shown that a grouped network can provide less latency, by approximately a factor of n and at a reasonably good cost, as compared to a fully interconnected network when the rates of the two networks are equal. Thus, it is possible for a grouped network to provide relatively good bandwidth and small latency at a relatively low cost.

It should also be noted that, as described above, each class 73 of the network is preferably the same size or, in other words, has the same number of nodes 52. However, it is possible for various classes 73 of the network 50 to have different sizes. With respect to two classes 73 of different sizes, it may not be desirable for each node 52 of one of the classes 73 to be directly coupled to a respective node 52 of the other class 73.

Figure 8:
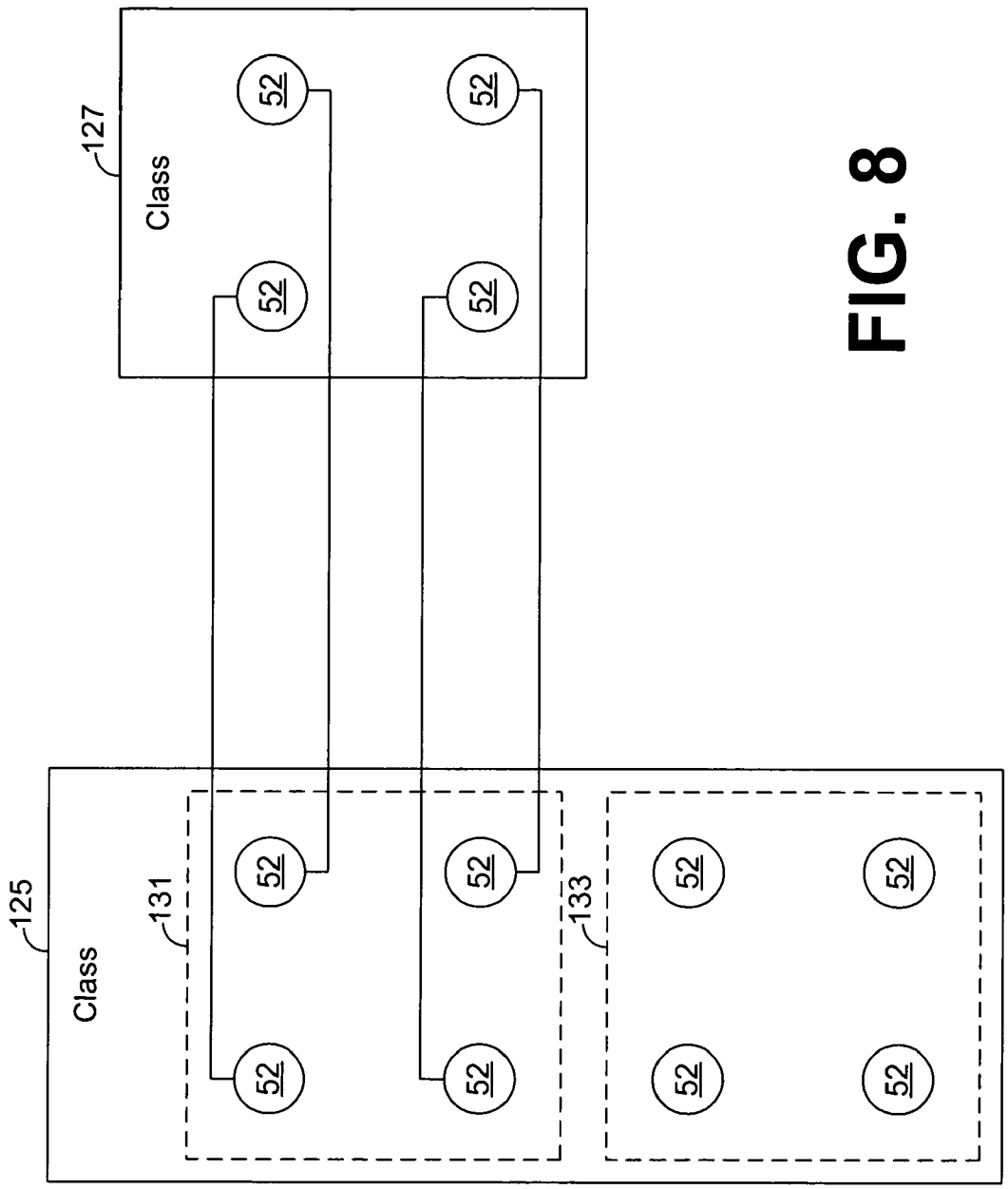
FIG. 8 is a block diagram illustrating an exemplary embodiment of two classes of different sizes within a nodal computer network.
Figure 9:
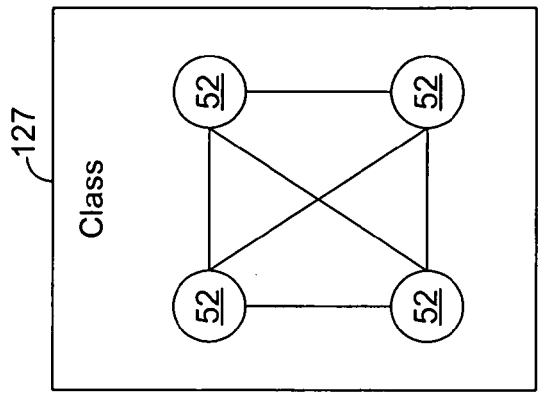
FIG. 9 is a block diagram illustrating connections or channels between nodes of the same class for the two classes depicted in FIG. 8.
Figure 9:
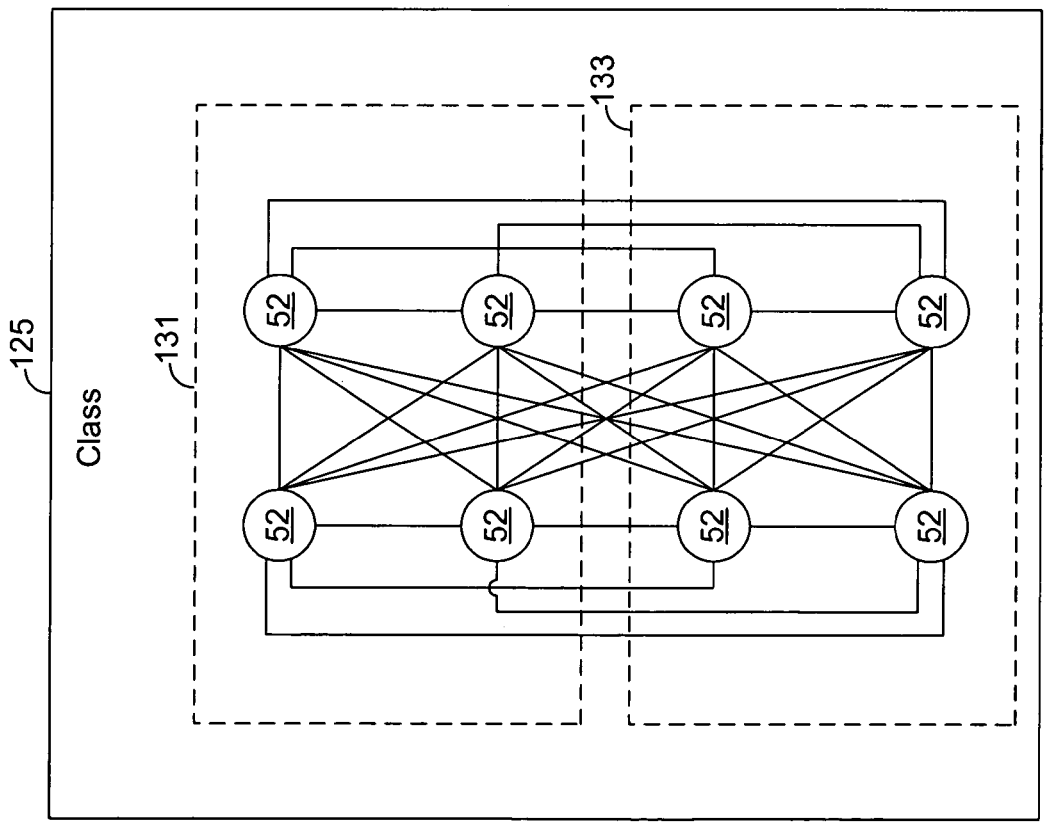

For example, FIG. 8 depicts two exemplary network classes 125 and 127. Class 125 has eight nodes 52, whereas class 127 has four nodes 52. For simplicity, connections or channels between the nodes 52 of the same class 125 or 127 are not shown in FIG. 8 but are shown in FIG. 9, and connections or channels between nodes 52 of different classes 125 and 127 are not shown in FIG. 9 but are shown in FIG. 8. As shown by FIG. 9, each node 52 of class 125 is directly coupled to each of the other nodes of class 125, and each node 52 of class 127 is directly coupled to each of the other nodes 52 of class 125, similar to the class 73 depicted by FIG. 5. In other words, the nodes 52 of class 125 are fully interconnected, and the nodes 52 of class 127 are fully interconnected.

As shown by FIG. 8, the nodes 52 of class 125 are grouped into two subclasses 131 and 133, and each of the nodes 52 of subclass 131 is directly coupled to a respective one of the nodes 52 of class 127, similar to the nodes 52 of the classes 73 depicted by FIG. 6. Notably, it is unnecessary for the nodes 52 of subclass 133 to be directly coupled to any of the nodes 52 of class 127.

If a node 52 of subclass 131 is to communicate an information packet to a node 52 of class 127, then the methodology described above with reference to FIG. 7 may be used to communicate the packet. In this regard, the information packet may be divided into different segments 42, and these segments 42 may be dispersed to the nodes 52 of subclass 131. Then, each node 52 of subclass 131 may transmit one of the segments 42 to a node 52 of class 127. The nodes 52 of class 127 may then coalesce the segments 42 to a single one of the nodes 52 (i.e., the destination node) in class 127, and this node 52 may then reassemble the segments 42 into the original information packet.

Further, a node 52 in class 127 may communicate an information packet to a node 52 in subclass 131 in the reverse direction. In this regard, segments 42 of an information packet may be dispersed to the nodes 52 of class 127 and then transmitted to and coalesced by the nodes 52 of subclass 131.

If a node 52 of subclass 133 is to communicate an information packet to a node 52 of class 127, then a similar methodology may be used to communicate the information packet except that an additional step of transmitting the segments 42 between subclasses 131 and 133 is employed. For example, the information packet may be divided into different segments 42, which are dispersed to the nodes 52 of subclass 133. Each node 52 of subclass 133 then transmits one of the segments 42 to a different one of the nodes 52 of subclass 131. Note that, as described above, each of the nodes 52 in class 125 is directly coupled to each of the other nodes 52 of the same class 125. Thus, a channel exists between each node 52 of subclass 133 and each node 52 of subclass 131. After receiving the segments 42, the nodes 52 of subclass 131 may transmit the segments 42 to the nodes 52 of class 127, which then coalesces the segments 42 to the destination node 52 in class 127, according to techniques previously described above.

In addition, a node 52 in class 127 may communicate an information packet to a node 52 in subclass 133 in the reverse direction. In this regard, segments 42 of an information packet may be dispersed to the nodes 52 of class 127 and then transmitted to the nodes of subclass 131. The nodes 52 of subclass 131 then transmit the segments 42 to the nodes 52 of subclass 133, which coalesces the segments 42 to the destination node 52 in subclass 133.

Figure 10:
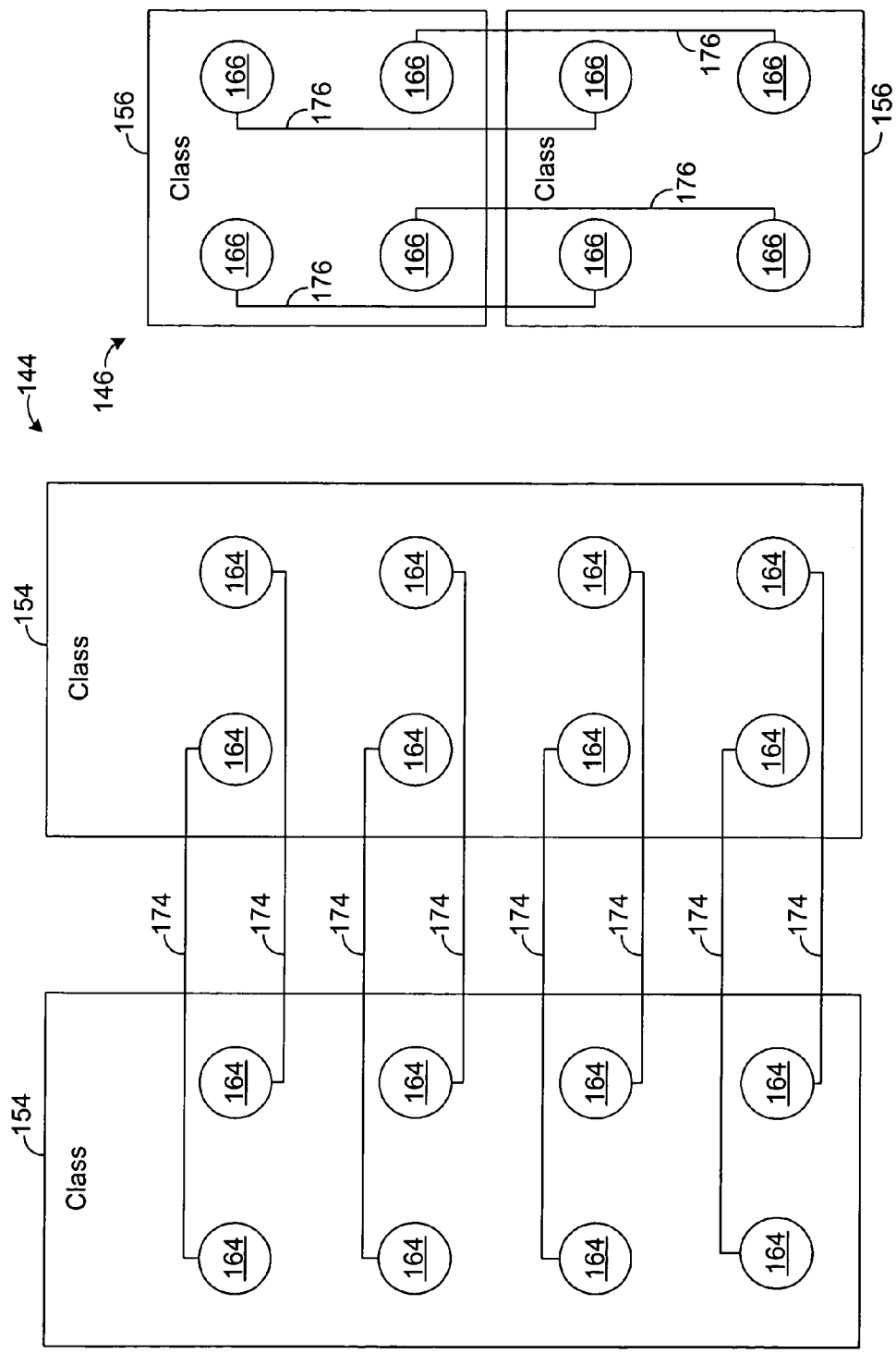
FIG. 10 is a block diagram illustrating an exemplary embodiment of two nodal computer networks having classes of different sizes.

The foregoing techniques for communicating between two classes of different sizes are particularly useful in interfacing two different nodal computer networks. For example, FIG. 10 depicts two nodal computer networks 144 and 146 respectively having classes 154 and 156 of different sizes. As a mere example, one of the networks 144 may be a processing network, and the other network 146 may be an input/output (I/O) network.

Each class 154 of network 144 has eight nodes 164 that are fully interconnected. In particular, each node 164 of the same class 154 is directly coupled to each of the other nodes 164 of the same class 154 via a channel. Further, each node 164 of one of the classes 154 is directly coupled to a respective node 164 of the other class 154 in the same network 144 via a channel 174. Note that, in network 144, nodes 164 of one class 154 may communicate to nodes 164 of the other class 154 via the methodology described above with reference to FIG. 7.

Similarly, each class 156 of network 146 has four nodes 166 that are fully interconnected. In particular, each node 166 of the same class 156 is directly coupled to each of the other nodes 166 of the same class 156 via a channel. Further, each node 166 of one of the classes 156 is directly coupled to a respective node 166 of the other class 156 in the same network 146 via a channel 176. Note that, in network 146, nodes 166 of one class 156 may communicate to nodes 166 of the other class 156 via the methodology described above with reference to FIG. 7.

Figure 11:
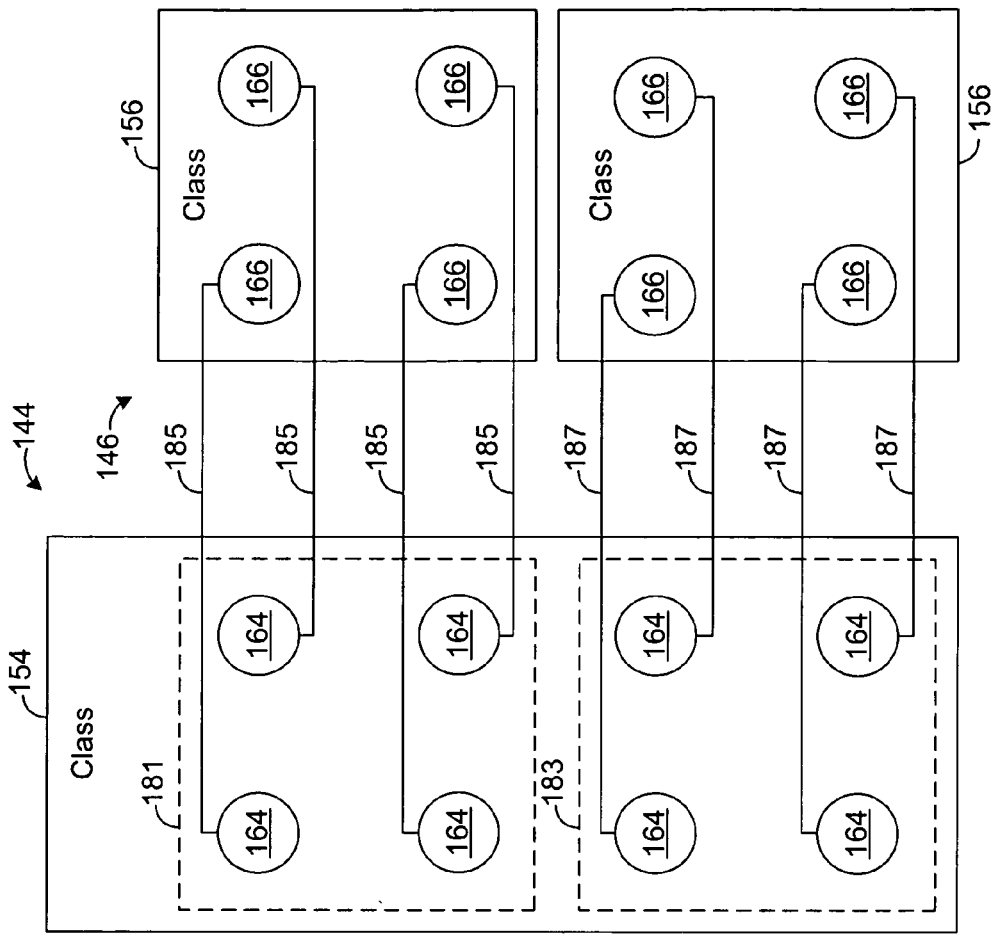
FIG. 11 is a block diagram illustrating the networks of FIG. 10 when a class of one of the networks is coupled to two of the classes of the other network.
Figure 11:
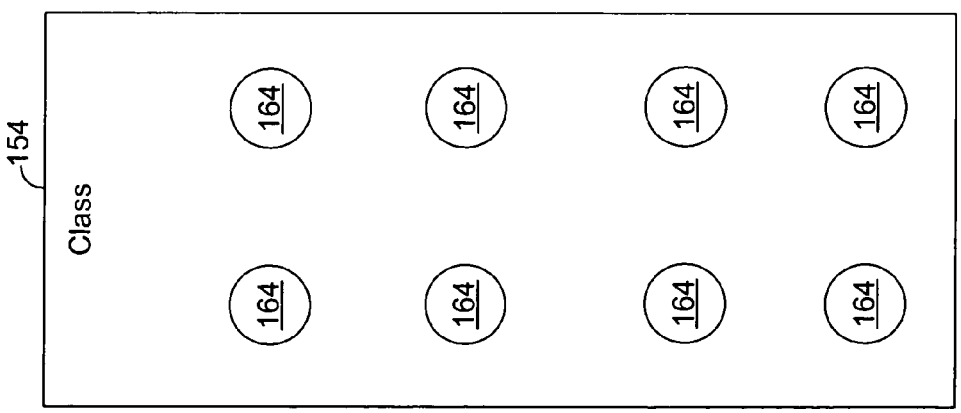

To interface the two networks 144 and 146, the classes 154 of the network 144 may be grouped into subclasses, which are then interfaced with the classes 156 of network 146 similar to the techniques described above with reference to FIG. 8. As an example, one of the classes 154 may be grouped into two subclasses 181 and 183, as shown by FIG. 11. Further, each node 164 of subclass 181 may be coupled directly to a different one of the nodes 166 of a single class 156 via a channel 185, and each node 164 of subclass 183 may be coupled directly to a different one of the nodes 166 of another single class 156 via a channel 187. Thus, according to the techniques described above for communicating between the classes 125 and 127 depicted by FIG. 8, any of the nodes 164 of subclasses 181 and 183 may communicate with any of the nodes 166 depicted in FIG. 11. Further, each of the classes 154 of the network 144 may be similarly coupled to the classes 156 of network 146 such that any of the nodes 164 of network 144 may communicate with any of the nodes 166 of network 164 via similar techniques.

The embodiments of the present disclosure have been described herein as dividing an information packet into a number of segments such that each node of a class or subclass transmits one of the segments to a node of another class. However, it is possible for each node to transmit more than one segment. For example, if the number of segments of an information packet exceeds the number of nodes in the source or destination class, then at least one node of the source or destination class may communicate more than one of the packet's segments along the same path. However, such an embodiment generally increases the network's transmission latency. Thus, it is generally desirable for a packet to be divided into a number of segments equal to or less than the number of nodes in the source class and the number of nodes in the destination class.

The invention claimed is:

1. A nodal network for use in a multiprocessor computer system, comprising:

a plurality of nodes grouped into different classes, said classes including at least a first class of fully interconnected nodes and a second class of fully interconnected nodes, said second class having at least three nodes including a destination node, said first class having at least three nodes including a source node, said source node having an information packet to be communicated to said destination node, said source node configured to divide said information packet into segments and to disperse a plurality of said segments among said nodes of said first class by transmitting each of said plurality of said segments directly to a respective one of said nodes of said first class such that said plurality of said segments are received by different ones of said nodes of said first class, each of said nodes of said first class receiving a respective one of said plurality of said segments directly from said source node configured to transmit the respective one segment received by said each node of said first class directly to a respective one of said nodes of said second class such that said plurality of said segments are received by different ones of said nodes of said second class, wherein said first class is not fully interconnected with said second class, and wherein each of said plurality of nodes comprises a respective processor of said multiprocessor computer system.

2. The network of claim 1, wherein said first class is grouped into at least a first subclass of fully interconnected nodes and a second subclass of fully interconnected nodes, and wherein said nodes of said first subclass are configured to transmit each of said plurality of said segments directly to said nodes of said second subclass.

3. The network of claim 1, wherein the path lengths of all paths from said source node to said destination node taken by said plurality of said segments are equal.

4. The network of claim 1, wherein said nodes of said second class, upon receiving said plurality of said segments, are configured to coalesce said plurality of said segments directly to said destination node.

5. The network of claim 1, wherein each of said nodes of said second class receiving a respective one of said plurality of said segments directly from said first class is configured to transmit the respective one segment received by said each node of said second class directly to said destination node.

6. A nodal network for use in a multiprocessor computer system, comprising:
a first plurality of nodes that are fully interconnected, said first plurality of nodes including at least three nodes; and
a second plurality of nodes that are fully interconnected, said second plurality of nodes including at least three nodes, a source node within said second plurality of nodes configured to divide an information packet into segments, said source node further configured to disperse a plurality of said segments directly to different ones of said second plurality of nodes, each node of said second plurality of nodes receiving a respective one of said plurality of said segments configured to transmit the respective one segment received by said each node of said second plurality of nodes directly to said first plurality of nodes such that said plurality of segments are received by different ones of said first plurality of nodes,
wherein said first plurality of nodes is not fully interconnected with said second plurality of nodes, and wherein each of said first and second plurality of nodes comprises a respective processor of said multiprocessor computer system.

7. The network of claim 6, wherein said first plurality of nodes includes a destination node to which said information packet is destined, said first plurality of nodes configured to coalesce said plurality of said segments such that each of said plurality of said segments is received by said destination node.

8. The network of claim 7, wherein said destination node is configured to reassemble said segments.

9. The network of claim 6, wherein each node of said first plurality of nodes receiving a respective one of said plurality of said segments directly from said second plurality of nodes is configured to transmit the respective one segment received by said each node of said first plurality of nodes directly to said destination node.

10. A method for use in a nodal network of a multiprocessor computer system, comprising:
providing a plurality of nodes grouped into different classes, each of said nodes fully interconnected with other nodes of the same class but not fully interconnected with nodes of other classes, each of said classes having at least three nodes;
dividing an information packet into segments at a node in a first class of said classes;
dispersing said segments among nodes of said first class, said dispersing comprising transmitting each of a plurality of said segments from said source node directly to a respective one of said nodes of said first class such that said plurality of said segments are received by different ones of said nodes of said first class; and
transmitting each of said plurality of said segments from a respective node of said first class directly to a respective node of a second class of said classes such that said plurality of said segments are received by different ones of said nodes of said second class.

11. The method of claim 10, further comprising coalescing each of said plurality of said segments to a single node of said second class.

12. The method of claim 10, further comprising grouping at least one of said classes into at least a first subclass and a second subclass.

13. The method of claim 10, further comprising transmitting each of said plurality of said segments from a respective node of said second class receiving said each segment directly from said first class directly to a destination node of said second class.

14. A method for use in a nodal network of a multiprocessor system, comprising:
providing a plurality of nodes grouped into different classes, said classes including at least a first class of fully interconnected nodes and a second class of fully interconnected nodes, each of said classes having a plurality of nodes, said first class including a source node having an information packet to be communicated to a destination node of said second class, wherein said first class is not fully interconnected with said second class;
dividing said information packet into different segments;
dispersing said segments directly to different nodes of said first class, said dispersing comprising transmitting each of a plurality of said segments from said source node directly to a respective one of said nodes of said first class such that said plurality of said segments are received by different ones of said nodes of said first class; and
for each of said nodes of said first class that receives a respective one of said plurality of said segments from said source node, transmitting said respective one segment directly to a respective node of said second class such that said plurality of said segments are received by different ones of said nodes of said second class.

15. The method of claim 14, further comprising transmitting each of said plurality of said segments from a respective node of said second class receiving said each segment directly from said first class directly to a destination node of said second class.

* * * * *